Figure 1:
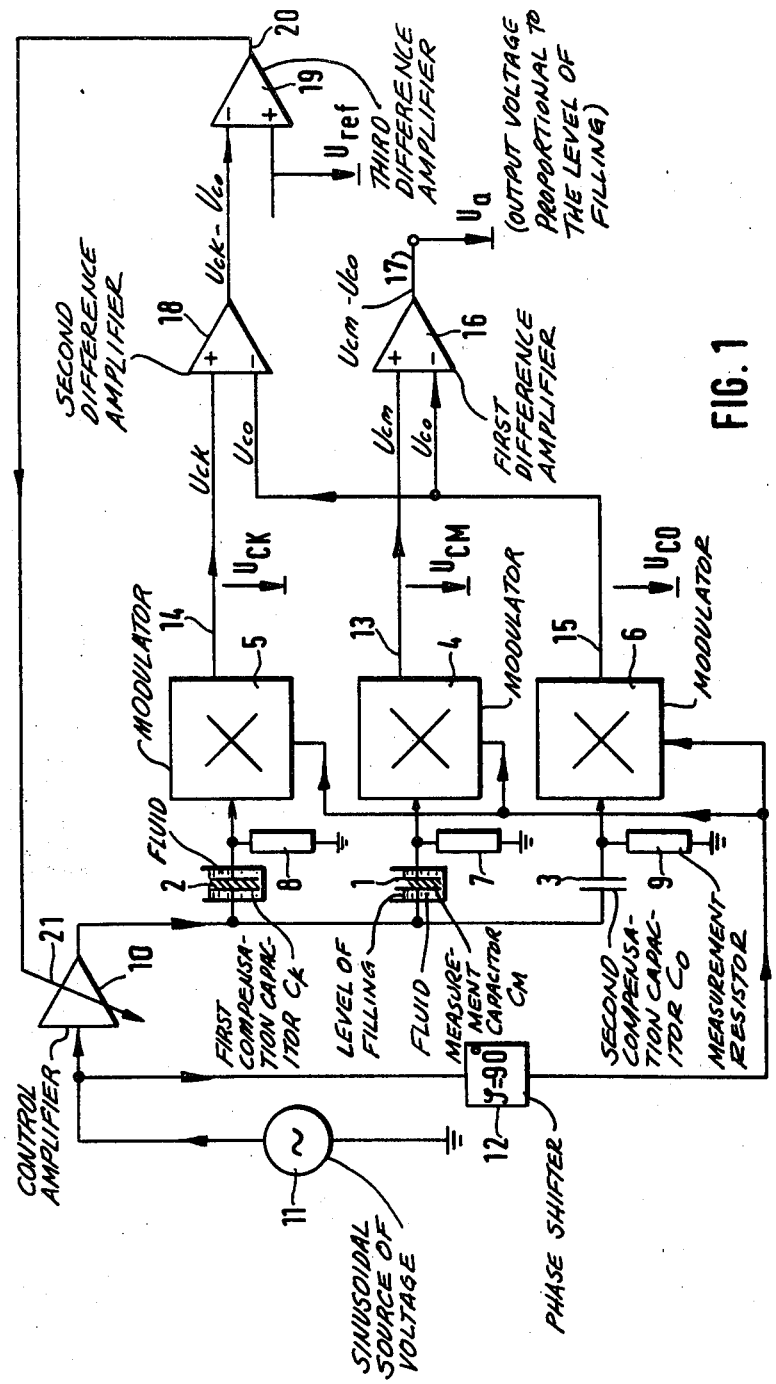

United States Patent [19]

Kühnel

[11] 4,418,569
[45] Dec. 6, 1983

[54] DEVICE FOR THE CAPACITIVE MEASUREMENT OF THE FILLING LEVEL OF FLUID TO A CONTAINER

[75] Inventor: Frank Kühnel, Eschborn, Fed. Rep. of Germany

[73] Assignee: VDO Adolf Schindling AG, Frankfurt am Main, Fed. Rep. of Germany

[21] Appl. No.: 204,392

[22] Filed: Nov. 6, 1980

[30] Foreign Application Priority Data

Nov. 14, 1979 [DE] Fed. Rep. of Germany ....... 2945965

[51] Int. Cl.$^3$ ............................................. G01F 23/26
[52] U.S. Cl. ................................ 73/304 C; 324/61 P
[58] Field of Search ...................... 73/304 C; 324/61 P

[56] References Cited

U.S. PATENT DOCUMENTS

| | | | |
|---|---|---|---|
| 2,530,619 | 11/1950 | Kliever | 73/304 C |
| 2,918,818 | 12/1959 | Meyer | 73/304 C |
| 3,301,056 | 1/1967 | Blanchard et al. | 73/304 C |
| 3,534,606 | 10/1970 | Stamler et al. | 73/304 C |
| 3,553,575 | 1/1971 | Shea | 73/304 C X |
| 4,214,479 | 7/1980 | Maier | 73/304 C |
| 4,235,106 | 11/1980 | Maltby et al. | 73/304 C |
| 4,262,531 | 4/1981 | Hewitt et al. | 73/304 C |
| 4,350,040 | 9/1982 | Fasching et al. | 324/61 P X |

Primary Examiner—Daniel M. Yasich
Attorney, Agent, or Firm—Martin A. Farber

[57] ABSTRACT

A device for the capacitive measurement of a level of filling having a measurement capacitor which dips into the fluids to be measured in accordance with the filling level thereof, and a unit for forming an electric value corresponding to the filling level and a unit for compensating for different dielectric constants of fluids which comprise a compensation capacitor dipping into the fluid. A circuit forms an electric value corresponding to the filling level and compensates the different dielectric constants of the fluid such that only the imaginary part of the complex conductance of the measurement capacitor and of the compensation capacitor enters into the electric value, but not the real part thereof in each case.

8 Claims, 2 Drawing Figures

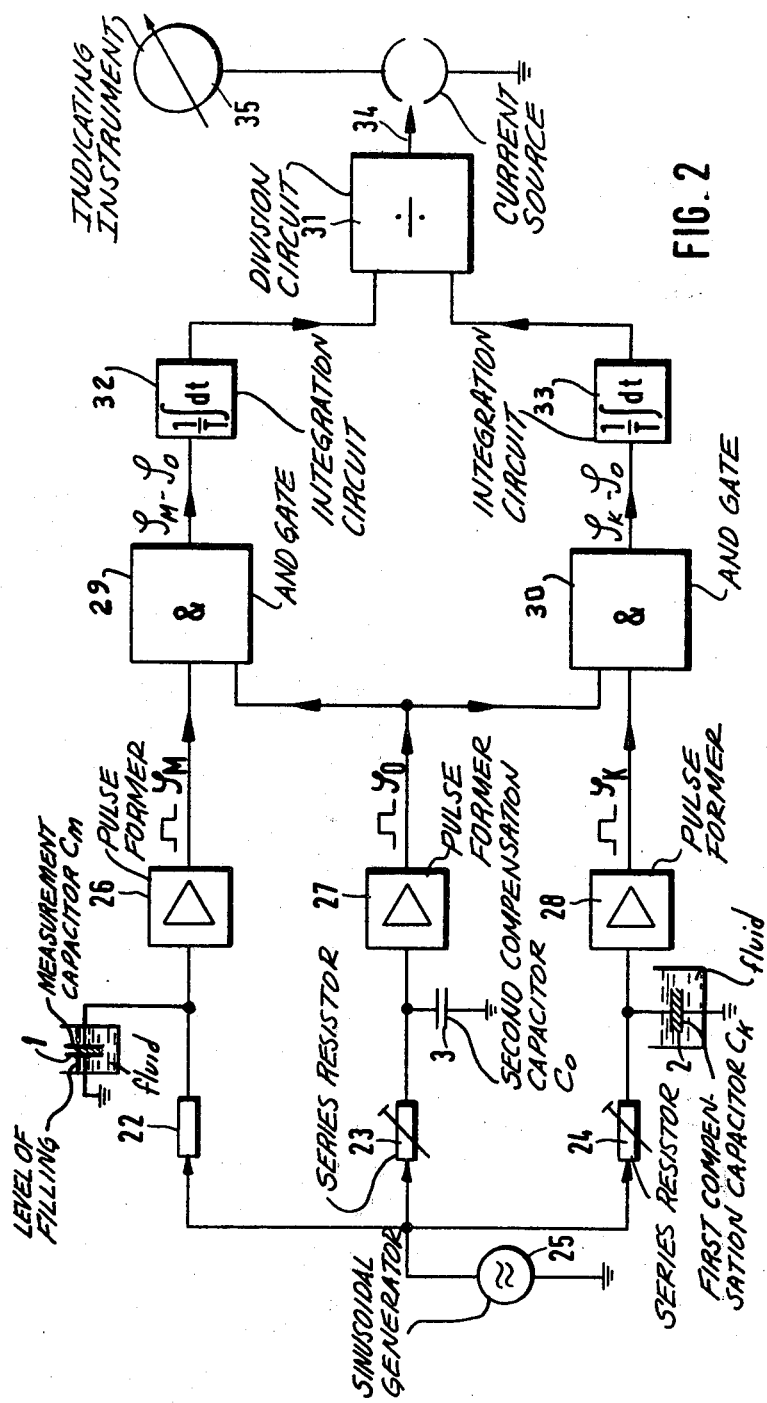

DEVICE FOR THE CAPACITIVE MEASUREMENT OF THE FILLING LEVEL OF FLUID TO A CONTAINER

The present invention refers to a device for a capacitive measurement of the level of fluid filling a container with a measurement capacitor which dips into the fluid in the container, and means for forming an electric value corresponding to the filling level and means for compensating for different dielectric constants of the fluid which comprise a compensation capacitor dipping into the fluid.

In one such device, in order to compensate for different dielectric constants of the fluid and particularly of fuel of different methanol content, there have been proposed as means for compensation:

A first compensation capacitor with the fluid as dielectric, a second compensation capacitor of the same dimensions as the first compensation capacitor but with air as dielectric, a second measurement capacitor of the same dimensions as the first measurement capacitor but with air as dielectric instead of the fluid into which the first measurement capacitor partially dips, and an evaluation circuit arrangement in which the capacitors are so arranged as to form the relationship $$h = \frac{1}{\ell} \frac{C_{KO}(C_M - C_{MO})}{C_{MO}(C_K - C_{KO})}$$

in which:

h is the height of the portion of the first measurement capacitor extending into the fluid;

l is the total height of the first measurement capacitor;

$C_K$ is the capacitance of the first compensation capacitor in the fluid;

$C_{KO}$ is the capacitance of the second compensation capacitor in air;

$C_M$ is the capacitance of the first measurement capacitor in the fluid; and $C_{MO}$ is the capacitance of the second measurement capacitor in air.

In the measurement devices heretofore proposed in this connection in order to compensate for different influences of the dielectric constant, there have been proposed circuit arrangements which make possible an evaluation of the charging time of the first measurement capacitor (also designated in the following as a measurement capacitor), and of the other capacitors. Specifically, one such proposed circuit arrangement has the features that, in order to determine the capacitance of the first and second compensation capacitors, there are provided in each case at least one constant source of current, means for charging the capacitors to a predetermined voltage, means for discharging or recharging each capacitor, and means for producing synchronized pulses having a pulse duration which is independent of the charging time; that, in order to form the differences of the capacitances thus ascertained, means are provided for effecting a pulse-duration subtraction of the synchronized pulses; and that for the division of a capacitance by the difference of two other capacitances the capacitance can be switched to a source of constant current controlled by a control voltage and the control voltage is formed by means for determination of the average value from a pulse produced by the pulse-duration subtraction.

Although these devices give a good compensation of different dielectric constants, it has been found that, nevertheless, measurements of filling level may be subject to considerable errors.

It has been found that this error is to be ascribed to different electric conductances of the fluids to be measured, particularly when the fluid is a fuel of varying methanol content.

Starting from this discovery, the object of the invention is so to improve a device for the capacitive measurement of filling level with means for compensation for different dielectric constants of the fluid that it permits an accurate measurement of the filling level with different fluids in all cases.

This object is achieved in accordance with the invention for a device of the type indicated above by means for the formation of the electric value corresponding to the filling level and for the compensation of the different dielectric constants of the fluid such that only the imaginary part of the complex conductance of the measurement capacitor and of the compensation capacitor enters into the electric value but not the real part thereof in each case. In this device, the conductance of the fluid to be measured no longer has any effect on the result of the measurement, so that, without a change in the device, the filling levels of fluids of very different physical properties can be reliably measured.

Particularly suitable embodiments of the devices which, in addition to the compensation for different dielectric constants, see to it that the electric conductance of the fluid is without effect on the result of the measurement, are provided by the invention.

In accordance therewith specifically a particularly effective suppression of the disturbing influence of the conductance of the fluid is obtained in the manner that means are provided to form in each case an output voltage which is proportional to the capacitance of each capacitor, which means comprises a source of sinusoidal voltage feeding a feed voltage to a circuit with the capacitor (which circuit is a subcircuit of the measurement device of the invention), a measurement resistor connected in series with the capacitor, means for producing a phase-shifted sinusoidal voltage which is shifted 90° with respect to the feed voltage, as well as an alternating-current multiplier for multiplying the voltage drop on the measurement resistor by the phase-shifted sinusoidal voltage and for filtering the alternating-voltage components out of the voltage formed as product so that an output voltage which is proportional to the capacitance of the capacitor and the frequency is obtained at the output of the alternating-current multiplier with low pass filter.

This device operates on the principle that upon the multiplication of the voltage drop on the measurement resistor, which is proportional to the current passing through the capacitor, the sinusoidal voltage which is shifted 90° in phase from the feed voltage, there is obtained a resultant voltage which has a direct-current portion of a value proportional to the measurement resistor but without influence of the electric conductivity of the measurement resistor and at least one alternating-current portion of twice the frequency of the feed voltage, which portion, while affected by the electric conductance of the measurement capacitor, is filtered out by the low-pass filter—together with another portion of alternating voltage—so that it does not appear in the measurement result.

In this device, therefore, the elimination of the disturbing influence of the electrical conductance of the fluid depends only on how well the alternating-current components are suppressed in the device. Such a suppression is, however, readily possible since the alternating-voltage portions have a relatively high frequency. The expense for this device can therefore be kept small with due consideration of the precise measurement to be obtained. Voltages are thus formed which depend only on the capacitance of the measured capacitor, in particular of the measurement capacitor and the first compensation capacitor, and which can be related to each other to form a variable which corresponds to the level of filling.

One such particularly suitable device is characterized by the fact that, preferably with a dimensioning $$C_{MO} = C_{KO} = C_O$$

in which $C_O$ is a second compensation capacitor arranged as a fixed component in the circuit arrangement, there the following features are provided in order to form the voltage proportional to the level of filling in accordance with the relationship $$U_a \sim \frac{C_M - C_O}{C_K - C_O} \sim h$$

three alternating voltage multipliers (4, 5, 6) having low pass properties, the first inputs of which are connected in each case to the measurement resistors (7, 8, 9) and the second inputs to the phase shifter (12) which supplies a voltage shifted in phase by 90 degrees with respect to a feed voltage, that the capacitors (1, 2, 3) and the series-connected measurement resistors (7, 8, 9) are fed via a control amplifier (10) of variable amplification factor with the amplified feed voltage, that the outputs (13, 14, 15) of the alternating voltage multipliers in which the voltages proportional to the capacitances of the measurement capacitor (1) and of the second compensation capacitor (3) are formed are connected to the inputs of a first difference amplifier (16) in order to form the numerator of the above relationship, the output of which difference amplifier is intended for the removal of an output voltage which is proportional to the level of filling, and that the outputs (14, 15) of the alternating voltage multipliers in which the voltages proportional to the capacitances of the first and second compensation capacitors (2, 3) are formed are connected to the inputs of a second difference amplifier (18) for the formation of the denominator of the above relationship that the output of the second difference amplifier is connected with the input of a third difference amplifier (19) which compares the input variable with a fixed reference voltage and the output of which is fed back with the control input (21) of the control amplifier in order to form the quotient of the above relationship as output voltage of the first difference amplifier (16).

This device permits a precise measurement of the level of filling regardless of the dielectric constants and the electrical conductance of the fluid to be measured, in a reliable manner and with relatively little expense since the device can be constructed with ordinary circuit components. The circuit arrangement for the formation of the electric variable which is proportional to the filling level comprises substantially two differential amplifiers for the formation of the differences corresponding to the numerator and the denominator of the above indicated relationship as well as a third differential amplifier in which the difference is formed between a voltage corresponding to the denominator of the relationship and a reference voltage. The reference voltage may in this connection preferably be about half as large as the feed voltage, i.e. the sinusoidal voltage of the sinusoidal generator. By the feedback of this third differential amplifier to the control input of the control amplifier which feeds the series connections of the capacitors with a measurement resistor, the formation of the quotient is effected in accordance with the above-indicated relationship. By this feedback the amplitude of the amplified feed voltage is so adjusted at all times via the control amplifier that the voltage corresponding to the denominator of the above-indicated relationship is equal to the reference voltage. Thus the difference voltage corresponding to the numerator of the above-indicated relationship with maximum level of filling is equal to the reference voltage, regardless of the properties of the fluid to be measured. The output voltage at the output of the first difference amplifier becomes zero when the formation of the difference of the numerator of the above-indicated relationship gives zero since the first measurement capacitor is completely outside the fluid in air. With maximum level of filling, on the other hand, the difference of the voltages which are proportional to the first measurement capacitor and the second compensation capacitor corresponding to the numerator or the above-indicated relationship is equal to the reference voltage. Between the value of zero and the maximum value equal to the reference voltage the output voltage at the output of the first difference amplifier varies linearly.

Another embodiment of the device for the capacitive measurement of filling level in which the influence of different dielectric constants of the fluid to be measured is eliminated and different electric conductance properties of the fluid have the smallest possible influence on the measurement result resides, that in order to form the variable proportional to the level of filling in accordance with the equation $$h \sim \frac{C_M - C_O}{C_K - C_O}$$

a circuit arrangement for phase measurement is employed. This circuit arrangement comprises specifically means for measuring the capacitance based on the principle of phase measurement, which means comprise a sinusoidal generator, a phase shifter formed of, respectively, a resistor and one of the capacitors and which is fed by the sinusoidal generator, in each case a square or rectangular pulse former fed with the voltage drop on the capacitor, which formers form rectangular pulses which are displaced by phase angles $\phi_M$, $\phi_O$ and $\phi_K$ which are proportional to the capacitances, two logic members connected to the square pulse formers, which logic members are for formation of the differences $\phi_M - \phi_O$ and $\phi_K - \phi_O$ and a division circuit for forming the quotient $$\frac{\phi_M - \phi_O}{\phi_K - \phi_O}$$

which is proportional to the filling level, and that the frequency of the sinusoidal generator is selected so as to maintain the influence of the electrical conductance of the capacitors on the quotient small.

This device is characterized by a simple circuit principle in which, by the selection of the operating frequency or feed frequency, the influence of the electrical conductance is kept small. The device operates linearly with small phase angles of up to about 15°.

Two embodiments of the device of the invention are described below with reference to the drawing containing two figures in which:

FIG. 1 shows a device for capacitive measurement of level which operates with alternating-voltage multiplication and a low-pass filter for suppression of alternating-voltage portions which are influenced by different electric conductances of the fluid; and FIG. 2 is a block diagram of a device for capacitive level measurement, operating on the principle of phase measurement, in which the influence of the electrical conductance is kept small by selection of the feed frequency.

FIG. 1 shows a circuit arrangement in which the capacitances of a measurement capacitor 1 dipping into the fluid to be measured, of a first compensation capacitor 2 which dips completely into the fluid to be measured, and of a second compensation capacitor 3 of a capacitance equal to the capacitance of the measurement capacitor and of the first compensation capacitor when they are located in air, are converted into proportional voltages $U_{CM}$, $U_{CK}$ and $U_{CO}$, the electric conductances of the capacitors not entering into these voltages.

In order to convert the capacitances into voltages there are used synchronous demodulators each of which comprises of an alternating voltage multiplier (with low-pass properties) 4, 5 and 6 respectively. To each first input of the alternating voltage multiplier there is connected a measurement resistor 7, 8 and 9 respectively, connected in each case in series with one of the capacitors 1, 2 and 3 respectively. The series connection of each capacitor with a measurement resistor is fed from a source of sinusoidal voltage 11 via a control amplifier 10. The sinusoidal voltage of the source 11 is coupled via a phase shifter 12 to the second input terminal in each of the multipliers 4, 5 and 6, the phase shifter 12 shifting the phase of the voltage by 90°.

At the outputs of the alternating voltage multipliers (having low pass properties) 13, 14 and 15 there are applied dc-voltages $U_{CM}$, $U_{CK}$, $U_{CO}$ which are proportional to the capacitances $C_M$, $C_K$, $C_O$ of the measurement capacitor and the first and second compensation capacitors. In this way it is established that the amplitudes of the feed voltages with which the series circuits of the capacitors with the measurement resistors are fed and of the phase shifted-sinusoidal voltage are constant as well as the frequency of these voltages.

The outputs 13 and 15 are connected to inputs of a first difference amplifier 16 at whose output 17 there is formed an output voltage $U_a$ which is proportional to the filling level, as will be explained below.

At a second difference amplifier 18 there is formed the voltage difference $U_{CK}-U_{CO}$ which is fed into a third difference amplifier 19 and is compared there with a reference voltage $U_{ref}$. The output 20 of the third difference amplifier is fed back to a control input 21 of the control amplifier 10. By this feedback it is seen to it that the amplified feed voltage at the output of the control amplifier 10 is always so high that the difference between $U_{CK}-U_{CO}$ on the one hand and $U_{ref}$ the reference voltage on the other hand is zero. Since this amplified feed voltage also feeds the first measurement capacitor and the third compensation capacitor, this amplified feed voltage proportionally influences the voltage difference $U_{CM}-U_{CO}$ which is formed in the first difference amplifier in the manner that the output voltage at the output 17 becomes proportional to the quotient $$\frac{U_{CM} - U_{CO}}{U_{CK} - U_{CO}}$$

which is a direct measure of the level of filling.

From FIG. 2 there can be noted another embodiment of the device for the capacitive measurement of filling level, which in this case operates in accordance with the principle of phase measurement. With this device there is also formed a fixed relationship between the level h and the capacitance CM of the measurement capacitor, the capacitance CK of the first compensation capacitor and the capacitance CO of the second compensation capacitor.

For this purpose, series connections of the measurement capacitor 1, the first compensation capacitor 2 and the second compensation capacitor 3 with series resistors 22, 23, and 24 respectively are acted on by a feed voltage which is supplied by a sinusoidal-waveform generator 25. The phase shift of the voltage drop which can be tapped off at the capacitors with respect to the feed voltage by the phase angle $\phi$ is approximately equal for small angles $\phi$ to the product of the capacitance of the capacitor times the series resistance and the angular frequency. Therefore, the phase angle formed by the measurement capacitor is $\phi_M = \omega \cdot R_{22} \cdot C_M$ and the phase angle $\phi_O$ caused by the second compensation capacitor $C_O$ is $\omega \cdot R_{23} \cdot C_O$. The phase angle $\phi_K$ finally is $\omega \cdot R_{24} \cdot C_K$.

The sinusoidal voltages which have thus been shifted in phase are fed into limiters or square-pulse formers 26, 27, 28. The square pulses given off by these square-pulse formers are also shifted in phase by $\phi_M$, $\phi_O$ and $\phi_K$.

In the logic members 29 and 30 which adjoin the outputs of the square-pulse formers and are developed as AND gates, the pulse trains of the first and the second square pulse generators are compared with each other in order in this way to form the values $\phi_M - \phi_O$ and $\phi_K - \phi_O$. In this way it is possible in simple manner to form in the logic members the differences of the phase shifts or phase angles since the amplitude of the square pulses remains constant. Accordingly, the relationship $\phi_M - \phi_O$ is formed in the logic member 29 and the relationship $\phi_K - \phi_O$ in the logic member 30. These values represent square pulses of a length which is dependent on the difference in phase angle of the two square pulses at the input of the logic members.

The square pulses which are given off by the logic members 29 and 30, which correspond to the phase difference $\phi_M - \phi_O$ and $\phi_K - \phi_O$ respectively are divided in the division circuit arrangement 31 in order to form the relationship $$\frac{\phi_M - \phi_O}{\phi_K - \phi_O}$$

which is proportional to the level of filling. This relationship does not contain any deviations of the dielectric modulus or of the electric conductivity.

Since the division circuit arrangement 31 is adapted advisedly for the processing of direct (dc) voltage signals, the square pulses which are given off by the logic members 29 and 30 are integrated in integration circuit arrangements 32 and 33.

By the selection of the frequency with which the sinusoidal waveform of the generator 25 oscillates, the influence of the electric conductivity on the measurement result can be kept particularly small.

The division circuit 31, via a control output 34, controls a current through an indicating instrument 35.

The circuit arrangement should advisedly be so dimensioned with the series resistors 22, 23, 24 that the phase angles do not exceed 15° to 20°. In such case the relationships which are formed in the device are approximately linear since the tangent to the phase angle is approximately equal to the radian measure of this angle.

I claim:

1. In a device for the capacitive measurement of a level of filling of a fluid in a container having a measurement capacitor which extends into the fluid to be measured in accordance with the level of filling thereof, means for forming an electric value corresponding to the level of filling, and means for compensating for different dielectric constants of the fluid which comprise a compensation capacitor positioned in the fluid, the improvement wherein a circuit comprises said means for forming an electric value corresponding to the level of filling and said means for compensating for different dielectric constants of the fluid such that only the imaginary part of the complex conductance of the measurement capacitor and of the compensation capacitor enters into said electric value exclusive of the real part thereof in each case, said means for compensating forms a value in accordance with the equation $$h = \frac{1}{l} \frac{C_{KO}(C_M - C_{MO})}{C_{MO}(C_K - C_{KO})}$$

in which:
h is the height of the section of the measurement capacitor extending into the fluid;
l is the total height of the measurement capacitor;
$C_K$ is the capacitance of a first compensation capacitor in the fluid;
$C_{KO}$ is the capacitance of a second compensation capacitor in air;
$C_M$ is the capacitance of the measurement capacitor in the fluid; and
$C_{MO}$ is the capacitance of the measurement capacitor in air;
said circuit includes:
formation means for the formation of output voltage proportional to the respective capacitances of said capacitors,
said formation means comprises a source of sinusoidal voltage for feeding feed voltage to subcircuits, respectively, for each of said capacitors, said subcircuits comprising
a measurement resistor connected in series with one of said capacitors, respectively,
said formation means includes means for producing a phase-shifted sinusoidal voltage which is shifted 90 degrees with respect to the feed voltage,
said subcircuits further comprising, respectively, for each of said capacitors means comprising an alternating voltage multiplier with low pass properties having a cut-off frequency less than twice the frequency of the feed voltage for multiplying the voltage drop on the corresponding said measurement resistor by the phase-shifted sinusoidal voltage and for filtering an alternating-voltage component out of the voltage formed as a product, so that an output voltage proportional to the capacitance of the corresponding one of said capacitors is present at the output of the alternating voltage multiplier with low pass properties.

2. In a device for the capacitive measurement of a level of filling of a fluid in a container having a measurement capacitor which extends into the fluid to be measured in accordance with the level of filling thereof, means for forming an electric value corresponding to the level of filling, and means for compensating for different dielectric constants of the fluid which comprise a compensation capacitor positioned in the fluid, the improvement wherein a circuit comprises said means for forming an electric value corresponding to the level of filling and said means for compensating for different dielectric constants of the fluid such that only the imaginary part of the complex conductance of the measurement capacitor and of the compensation capacitor enters into said electric value exclusive of the real part thereof in each case,
said circuit comprises means for measuring capacitance based on a principle of phase measurement for forming a value which is proportional to the level of filling in accordance with the relationship $$h \sim \frac{C_M - C_O}{C_K - C_O}$$

in which:
h is the height of the section of the measurement capacitor extending into the fluid;
$C_M$ is the capacitance of the measurement capacitor;
$C_K$ is the capacitance of a first compensation capacitor extending into the fluid; and
$C_O$ is the capacitance of a second, fixed compensation capacitor;
said means for measuring capacitance based on the principle of phase measurement comprises,
a sinusoidal generator,
phase shifters each comprising a resistor and one of said capacitors, respectively,
each of said phase shifters is connected to and fed by said sinusoidal generator,
a plurality of square pulse former means each connected to said capacitors, respectively, for being fed with the voltage drop at each of the respective said capacitors, said square pulse former means forming square pulses, respectively, displaced by phase angles $\phi_M$, $\phi_O$ and $\phi_K$ proportional to the capacitances of said measurement capacitor, said second compensation capacitor and said first, fixed compensation capacitor, respectively,
two logic means connected to respective of two of said square pulse former means for forming the differences $\phi_M - \phi_0$ and $\phi_K - \phi_O$, respectively, and a division circuit means operatively connected to outputs of said two logic means for forming the quotient $$\frac{\phi_M - \phi_O}{\phi_K - \phi_O}$$

which is proportional to the level of filling, and
the frequency of said sinusoidal generator is selected so as to keep the influence of the electric conductance of said measurement capacitors and said first compensation capacitor on the quotient small.

3. The device according to claim 1, wherein
said means for producing a phase-shifted sinusoidal voltage comprises a phase shifter,
said capacitors are preferably sized with $C_{MO} = C_{KO} = C_O$ in which $C_O$ is the capacitance of the second compensation capacitor arranged in the circuit as a fixed component,
said circuit includes,
means for the formation of an output voltage ($U_a$) which is proportional to the level of filling in accordance with the equation $$U_a \sim \frac{C_M - C_O}{C_K - C_O} \sim h$$

including,
three of said alternating voltage multipliers having low pass properties, each of said multipliers having first inputs connected to a respective of the measurement resistors and a second input connected to said phase shifter,
a control amplifier of variable amplification factor connected between said source of sinusoidal voltage and said capacitors with the measurement resistors, respectively, connected in series to said capacitors, such that said capacitors are fed with the feed voltage amplified,
two of said alternating voltage multipliers respectively, have outputs, respectively, forming the output voltages proportional to the capacitances of the measurement capacitor and of the second compensation capacitor,
a first differential amplifier means has inputs connected to said outputs, respectively, of said two alternating voltage multipliers and for forming the numerator of the above equation, said first differential amplifier means has an output means for the removal of the output voltage ($U_a$) proportional to the level of filling,
a third of said alternating voltage multipliers has an output forming the output voltage proportional to the capacitance of the first compensation capacitor,
a second differential amplifier means has inputs connected to the output of said third alternating voltage multiplier and to the output of that one of said two alternating voltage multipliers which is connected to said second compensation capacitor and for forming the denominator of the above equation,
a third differential amplifier means has one input connected with the output of said second differential amplifier means for receiving an input value and another input connected with a fixed reference value and for comparing the input value at said one input with the fixed reference voltage,
said third differential amplifier means has an output means fed back to a control input of said control amplifier for forming the quotient of the above equation as said output voltage ($U_a$) of said first differential amplifier means.

4. The measurement device according to claim 1 wherein said compensating means further comprises
a second compensation capacitor of equal capacitance in air to said first mentioned compensation capacitor.

5. In a device for the capacitive measurement of a level of filling of a liquid in a container, according to claim 1, the improvement wherein said compensating means further comprises
a second circuit having a second compensation capacitor of equal capacitance in air to said first compensation capacitor, said compensating means including said first mentioned and said second compensation capacitors connected to compensate for conductance of the fluid so that the electric value corresponding to said level of filling is dependent on the capacitance of each of said capacitors and independent of said conductance.

6. The device according to claim 2, further comprising
integrators each connected between each of said outputs, respectively, of said logic means and said division circuit means,
said division circuit means constitutes means for division of direct voltages.

7. The device for the capacitive measurement of the level of filling with compensation of the dielectric constants of the fluid according to claims 4 or 6, wherein, said means for compensating forms a value in accordance with the equation $$h = \frac{1}{l} \frac{C_{KO}(C_M - C_{MO})}{C_{MO}(C_K - C_{KO})}$$

in which:
h is the height of the section of the measurement capacitor extending into the fluid;
l is the total height of the measurement capacitor;
$C_K$ is the capacitance of a first compensation capacitor in the fluid;
$C_{KO}$ is the capacitance of a second compensation capacitor in air;
$C_M$ is the capacitance of the measurement capacitor in the fluid; and
$C_{MO}$ is the capacitance of the measurement capacitor in air;
said circuit includes:
formation means for the formation of output voltages proportional to the respective capacitances of said capacitors,
said formation means comprises a source of sinusoidal voltage for feeding feed voltage to subcircuits, respectively, for each of said capacitors, said subcircuits comprising
a measurement resistor connected in series with one of said capacitors, respectively,
said formation means includes means for producing a phase-shifted sinusoidal voltage which is shifted 90 degrees with respect to the feed voltage,
said subcircuits further comprising, respectively, for each of said capacitors
means comprising an alternating voltage multiplier with low pass properties having a cut-off frequency less than twice the frequency of the feed voltage for multiplying the voltage drop on the corresponding said measurement resistor by the phase-shifted sinusoidal voltage and for filtering an alternating-voltage component out of the voltage formed as a product, so that an output voltage proportional to the capacitance of the corresponding one of said capacitors is present at the output of the alternating voltage multiplier with low pass properties.

8. The device according to claims 4 or 6, wherein, said circuit comprises means for measuring capacitance based on a principle of phase measurement for forming a value which is proportional to the level of filling in accordance with the relationship $$h \sim \frac{C_M - C_O}{C_K - C_O}$$

in which:

h is the height of the section of the measurement capacitor extending into the fluid;

$C_M$ is the capacitance of the measurement capacitor;

$C_K$ is the capacitance of a first compensation capacitor dipping into the fluid; and $C_O$ is the capacitance of a second, fixed compensation capacitor;

said means for measuring capacitance based on the principle of phase measurement comprises, a sinusoidal generator, phase shifters each comprising a resistor and one of said capacitors, respectively, each of said phase shifters is connected to and fed by said sinusoidal generator, a plurality of square pulse former means each connected to said capacitors, respectively, for being fed with the voltage drop at each of the respective said capacitors, said square pulse former means forming square pulses, respectively, displaced by phase angles $\phi_M$, $\phi_O$ and $\phi_K$ proportional to the capacitances of said measurement capacitor, said second compensation capacitor and said first, fixed compensation capacitor, respectively, two logic means connected to respective of two of said square pulse former means for forming the differences $\phi_M - \phi_O$ and $\phi_K - \phi_O$, respectively, and a division circuit means operatively connected to outputs of said two logic means for forming the quotient $$\frac{\phi_M - \phi_O}{\phi_K - \phi_O}$$

which is proportional to the level of filling, and the frequency of said sinusoidal generator is selected so as to keep the influence of the electric conductance of said measurement capacitors and said first compensation capacitor on the quotient small.

* * * * *